United States Patent
Alapuranen et al.

(10) Patent No.: US 7,289,469 B2
(45) Date of Patent: *Oct. 30, 2007

(54) FAST SWITCHING OF FORWARD LINK IN WIRELESS SYSTEM

(75) Inventors: Pertti Olavi Alapuranen, Indialantic, FL (US); Kevin P. Johnson, Palm Bay, FL (US); Kevin L. Farley, Orlando, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/053,092

(22) Filed: Feb. 7, 2005

(65) Prior Publication Data

US 2005/0136923 A1    Jun. 23, 2005

Related U.S. Application Data

(63) Continuation of application No. 09/847,860, filed on May 2, 2001, now Pat. No. 6,853,646.

(51) Int. Cl.
*H04Q 7/00* (2006.01)

(52) U.S. Cl. .................... 370/329; 370/443

(58) Field of Classification Search ........ 370/310–312, 370/316, 329, 328, 338, 320–323, 335–337, 370/431, 432, 433, 437, 441, 442, 349, 314, 370/326, 341, 458, 462, 464, 332, 443, 447, 370/449, 454, 461

See application file for complete search history.

(56) References Cited

U.S. PATENT DOCUMENTS 4,675,863 A  6/1987 Paneth et al.
4,817,089 A  3/1989 Paneth et al.

(Continued)

FOREIGN PATENT DOCUMENTS

EP    0 526 106 A2    2/1993

(Continued)

OTHER PUBLICATIONS

Melanchuk, et al., "CDPD and Emerging Digital Cellular Systems," *Digest of Papers of COMPCON*, Computer Society Conference 1996, Technologies for the Information Superhighway, Santa Clara, Ca., no. CONF. 41, pp. 2-8 (Feb. 25, 1996), XP000628458 Institute of Electrical and Electronics Engineers.

*Primary Examiner*—Brenda Pham
(74) *Attorney, Agent, or Firm*—Volpe and Koening, P.C.

(57) ABSTRACT

A technique for distributing channel allocation information in a demand access communication system. In a preferred embodiment, for use with Code Division Multiple Access (CDMA) type communication, multiple access codes are used that have a defined code repeat period or code epoch. For each such epoch duration, a central controller, such as located at a base station in the case of operating a forward link, determines a schedule of assignment of traffic channels to active terminals for each epoch. For each terminal designated as active during the epoch, an active terminal unit identifier is assigned. For each terminal designated as active during the epoch, the base station assigns a list of active channels for such terminal unit. Prior to the start of each epoch, a channel set up message is sent on one of the forward link channels, such as a paging channel. The channel set up message indicates the terminal unit identifiers and the lists of active channels for epochs of the associated traffic channel(s) that are to follow. At the remote terminal unit, upon receiving a paging channel message, an active terminal identifier is determined from each paging channel message and compared to a previously assigned terminal identifier. On a predetermined subsequent epoch, the indicated active traffic channel, as indicated from the list of active traffic channels indicated by a received paging channel message, are then processed.

22 Claims, 5 Drawing Sheets

U.S. PATENT DOCUMENTS

| | | |
|---|---|---|
| 4,912,705 A | 3/1990 | Paneth et al. |
| 5,022,024 A | 6/1991 | Paneth et al. |
| 5,114,375 A | 5/1992 | Wellhausen et al. |
| 5,282,222 A | 1/1994 | Fattouche et al. |
| 5,325,419 A | 6/1994 | Connolly et al. |
| 5,412,429 A | 5/1995 | Glover |
| 5,414,728 A | 5/1995 | Zehavi |
| 5,442,625 A | 8/1995 | Gitlin et al. |
| 5,463,629 A | 10/1995 | Ko |
| 5,490,136 A | 2/1996 | Sereno et al. |
| 5,535,207 A | 7/1996 | Dupont |
| 5,585,850 A | 12/1996 | Schwaller |
| 5,592,470 A | 1/1997 | Rudrapatna et al. |
| 5,617,423 A | 4/1997 | Li et al. |
| 5,619,492 A | 4/1997 | Press et al. |
| 5,655,001 A | 8/1997 | Cline et al. |
| 5,657,358 A | 8/1997 | Panech et al. |
| 5,687,194 A | 11/1997 | Paneth et al. |
| 5,697,059 A | 12/1997 | Carney |
| 5,742,592 A | 4/1998 | Scholefield et al. |
| 5,790,549 A | 8/1998 | Dent |
| 5,909,651 A * | 6/1999 | Chander et al. ............ 455/466 |
| 6,804,528 B1 | 10/2004 | Laroia et al. |
| 6,819,930 B1 * | 11/2004 | Laroia et al. ............... 455/450 |
| 6,853,646 B2 * | 2/2005 | Alapuranen et al. ........ 370/433 |

FOREIGN PATENT DOCUMENTS

| | | |
|---|---|---|
| EP | 0 682 423 A2 | 11/1995 |
| EP | 0 720 309 A2 | 12/1995 |
| EP | 0 719 062 A2 | 6/1996 |
| WO | WO96/08934 | 3/1996 |
| WO | WO96/37081 | 11/1996 |
| WO | WO97/26726 | 7/1997 |
| WO | WO99/63682 | 12/1999 |

* cited by examiner

PIPE SCHEDULE 252

| SAU ID | | | | | ... | | | |
|---|---|---|---|---|---|---|---|---|
| | | | | | | | | |
| | | | | | | | | |
| | | | | | | | | |

EPOCH # (rows) / PIPE # (columns)

FIG. 6

PIPE CONFIG TABLE 250

CHHS LIST

| PIPE # | | | | | | | | |
|---|---|---|---|---|---|---|---|---|
| 1 | 1 | 2 | 3 | 4 | | | | |
| 2 | 1 | 2 | 3 | 4 | | | | |
| 3 | 1 | 2 | 3 | | | | | |
| 4 | 3 | 4 | | | | | | |
| 5 | 3 | 4 | 5 | 6 | | | | |
| 6 | 3 | 4 | 5 | 6 | | | | |
| 7 | 5 | 6 | 7 | 8 | | | | |
| 8 | 5 | 6 | 7 | 8 | 9 | 10 | | |
| 9 | 1 | 2 | 3 | 4 | 5 | 6 | 7 | 8 |
| 10 | 3 | 4 | 5 | 6 | 7 | 8 | 9 | 10 |

FIG. 5

FAST SWITCHING OF FORWARD LINK IN WIRELESS SYSTEM

RELATED APPLICATION

This application is a continuation of U.S. application Ser. No. 09/847,860, filed May 2, 2001 now U.S. Pat. No. 6,853,646. The entire teachings of the above application are incorporated herein by reference.

BACKGROUND OF THE INVENTION

This invention relates generally to wireless communication systems, and more particularly to a technique for high speed re-allocation of coded radio channel resources that are shared among a number of users.

Demand for wireless communications equipment and services continues to grow at an unprecedented rates throughout the world. Increasingly, such systems are commonly relied upon to provide voice and data communications to a growing sector of the public. While these systems originally depended upon analog signaling technology, there is essentially unanimous agreement that future systems will be based on various types of digital signal coding schemes.

The typical wireless communication system is a point to multi-point type system in which a central base station communicates with a number of remote units located within a local geographic area of coverage known as a cell. This system provides for duplex communication such that signals may be sent in both a forward direction (from the base station to the remote unit) as well as in a reverse direction (from the mobile remote unit back to the base station). In order to support communication between the remote unit and networks such as the Public Switched Telephone Network (PSTN), or data networks such as the Internet, the wireless system must also provide for various other logical components and functional entities.

Consider the Code Division Multiple Access (CDMA) and Time Division Multiple Access (TDMA) digital systems presently in widespread use. Each of these systems provide for certain logical types of the radio channels that make up the forward link and reverse link. In particular, the forward link channels often include a pilot channel, paging channels, and multiple forward traffic channels. The traffic channels are used to carry the payload data between the base station and the mobile unit. A pilot channel is also typically required to allow the remote unit to maintain synchronization with the base station. The paging channels provide a mechanism for the base station to inform the remote unit of control information, such as the assignment of particular forward traffic channels to particular connections and/or subscriber units.

Likewise, an access channel is provided in the reverse direction in addition to reverse traffic channels. The access channels allow the remote units to communicate control information with the base station, such as to send messages indicating the need to allocate or deallocate connections as required.

Unfortunately, users both compete for access to the available radio spectrum, while at the same time demanding data transmission rates that are as fast as possible. This situation is the most acute in the forward link direction, where users of remote computing equipment are performs tasks such as accessing the World Wide Web. The forward link direction typically represents the direction of greatest data transfer, e.g., in connection with the downloading of web pages and files from remote servers.

It is critical therefore, for the channel allocation algorithms, and radio channel protocols to be as efficient as possible. As demand for access to the available radio spectrum changes almost instantly among a large group of users of such a wireless data network, maximum efficiency requires the ability to rapidly reassign channels. However, traditional wireless system architectures and protocols, such as those used in cellular telephone systems, were not designed with rapid channel changing in mind. They typically keep an end-to-end connection open for the duration of a session or call, and reassign channels only as a mobile unit moves from cell to cell. Thus, these architecture use a protocol whereby a paging channel is used to send a message to a remote unit when a channel change is needed. The message is then received and acknowledged by the remote unit returning a channel acknowledgment to the central base station.

In an idea wireless data environment, the channel assignments should be changeable many times during the duration of a given session, as instantaneous demand for access to the available radio bandwidth ebbs and flows, e.g., as individual users make requests to download web pages and files.

SUMMARY OF THE INVENTION

The present invention is a technique adapted for allocating channels in a demand access system. In a preferred embodiment, the invention is implemented in a system which supports Code Division Multiple Access (CDMA) communication among a group of terminals wherein the terminals share access to a predetermined number of CDMA traffic channels.

A method according to the invention involves first assigning to the group of terminals a multiple access code having a code epoch repeat duration. In a preferred embodiment, the code epoch duration should remain constant, even if the underlying data rates change due to error cording requirements.

For each such epoch duration, a central controller such as located at a base station, determines a schedule of assignment of traffic channels to active terminals for each epoch. For each terminal designated as active during the epoch, an active terminal unit identifier is assigned. The active terminal unit identifier should be as short as possible to allow the channel assignment message to be as short as possible. Thus, the active terminal unit identifier does not have to uniquely identify the remote terminal among all possible terminals in the system, and only needs to uniquely identify the terminal among other active terminals being serviced by the particular base station.

For each terminal designated as active during the epoch, the base station assigns a list of active channels for such terminal unit. Prior to the start of each epoch, a channel set up message is sent on the forward link, such as a paging channel. The channel set up message indicates the terminal unit identifiers and the lists of active channels for such epoch which is to follow.

At the remote terminal unit, upon receiving a paging channel message, an active terminal identifier is determined from each paging channel message and compared to a previously assigned terminal identifier. On a predetermined subsequent epoch, the indicated active traffic channel, as indicated from the list of active traffic channels indicated by a received paging channel message, are then processed.

The paging channel messages may be time slotted so that multiple active remote terminals can be services by a shared paging channel.

In a preferred embodiment, the list of active channels for each epoch may be indicated by a pipe group identifier, with each pipe group identifier effectively indicating a group of active channels that are assigned together.

The paging channel messages should be sent at a time advanced sufficiently to permit code setup in a receiver prior to the epoch containing the associated traffic channel data.

The paging channel set up message may also include other information, such as to indicate a coding rate for the associated traffic channels, a specification for which portions of the payload are intended for particular terminals, or a reverse link channel identifier for the remote terminal to use for transmissions back to the base station during the associated epoch. Still other information, such as messages for control processors in the terminals, can be carried.

Allocation of forward link channels in this fashion affords precise and rapid control over which terminals are assigned to specific traffic channels, on an epoch-by-epoch basis. This arrangement, therefore, affords great flexibility in capacity management, allowing channel allocation decisions to be made on a very fine time scale. For example, channel switch decisions can thus be made rapidly, in response to changes in radio propagation conditions, such as fading conditions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a pipe configuration table maintained at a base station processor.

FIG. 6 is a pipe schedule.

DETAILED DESCRIPTION OF A PREFERRED EMBODIMENT

Figure 1:
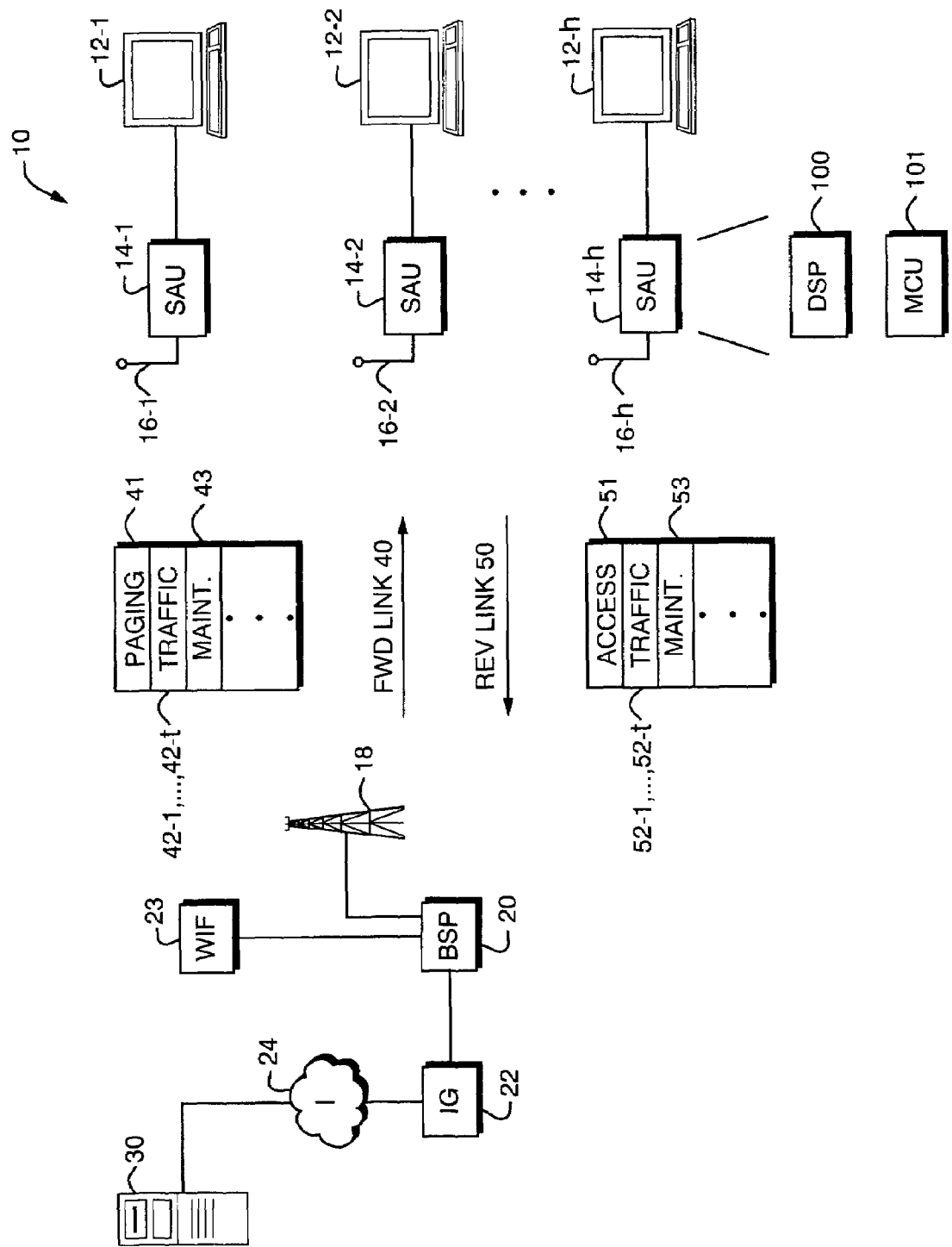
FIG. 1 is a block diagram of a wireless data communication system in which the present invention may be implemented.

FIG. 1 is a block diagram of a wireless communication system 10 that makes use of a code channel assignment scheme and message protocol where, prior to the start of each code epoch, a paging channel message is sent that indicates terminal unit identifiers and active channels for such epoch.

In the following detailed description of a preferred embodiment, the communication system 10 is described such that the shared channel resource is a wireless or radio channel. However, it should be understood that the techniques described here can be applied to allow shared access to other types of media such as telephone connections, computer network connections, cable connections, and other physical media to which access is granted on a demand driven basis.

The communication system 10 includes a number of Personal Computer (PC) devices 12-1, 12-2, . . . 12-h, . . . 12-1, corresponding remote, mobile Subscriber Access Units (SAUs) 14-1, 14-2, . . . 14-h, . . . 14-1, and associated antennas 16-1, 16-2, . . . 16-h, . . . 16-1. Centrally located equipment includes a base station antenna 18, and a Base Station Processor (BSP) 20. The BSP 20 provides connections to an from an Internet gateway 22, which in turn provides access to a data network such as the Internet 24, and network file server 30 connected to the network 22.

The system 10 is a demand access, point to multi-point wireless communication system such that the PCs 12 may transmit data to and receive data from network server 30 through bi-directional wireless connections implemented over forward links 40 and reverse links 50. It should be understood that in a point to multi-point multiple access wireless communication system 10 as shown, a given base station processor 20 supports communication with a number of different active subscriber access units 14 in a manner which is similar to a cellular telephone communication network.

The PCs 12 may typically be laptop computers 12-1, handheld units 12-h, Internet-enabled cellular telephones or Personal Digital Assistant (PDA)-type computers. The PCs 12 are each connected to a respective SAU 14 through a suitable wired connection such as an Ethernet-type connection.

An SAU 14 permits its associated PC 12 to be connected to the network file server 30 through the BSP 20, gateway 22 and network 24. In the reverse link direction, that is, for data traffic traveling from the PC 12 towards the server 30, the PC 12 provides an Internet Protocol (IP) level packet to the SAU 14. The SAU 14 then encapsulates the wired framing (i.e., Ethernet framing) with appropriate wireless connection framing and encoding. The appropriately formatted wireless data packet then travels over one of the radio channels that comprise the reverse link 50 through the antennas 16 and 18. At the central base station location, the BSP 20 then extracts the radio link framing, reformatting the packet in IP form and forwards it through the Internet gateway 22. The packet is then routed through any number and/or any type of TCP/IP networks, such as the Internet 24, to its ultimate destination, such as the network file server 30.

Data may also be transmitted from the network file server 30 to the PCs 12 in a forward link 40 direction. In this instance, an Internet Protocol (IP) packet originating at the file server 30 travels through the Internet 24 through the Internet gateway 22 arriving at the BSP 20. Appropriate wireless protocol framing and encoding is then added to the IP packet. The packet then travels through the antenna 18 and 16 to the intended receiver SAU 14. The receiving SAU 14 decodes the wireless packet formatting, and forwards the packet to the intended PC 12 which performs the IP layer processing.

Each SAU 14 typically has multiple channel signal processors 100 within it to perform the required wireless signal processing and protocol framing functions. This permits each SAU to receive multiple traffic channels 42 and paging channels 41 at the same time. Each SAU also has a Micro Controller Unit (MCU) 101 that coordinates the operation of the channel signal processors 100 and performs other functions, such as higher layer protocol processing.

A given PC 12 and the file server 30 can therefore be viewed as the end points of a duplex connection at the IP level. Once a connection is established, a user at the PC 12 may therefore transmit data to and receive data from the file server 30.

The reverse link 50 actually consists of a number of different types of logical and/or physical radio channels including an access channel 51, multiple traffic channels 52-1, . . . 52-t, and a maintenance channel 53. The reverse link access channel 51 is used by the SAUs 40 to send messages to the BSP 20 to request that traffic channels be granted to them. The assigned traffic channels 52 then carry payload data from the SAU 14 to the BSP 20. It should be understood that a given IP layer connection may actually have more than one traffic channel 52 assigned to it. In addition, a maintenance channel 53 may carry information such as synchronization and power control messages to further support transmission of information over the reverse link 50.

Similarly, the forward link 40 typically includes a paging channel 41, traffic channels 42-1 . . . 42-t, and maintenance channel 43. The paging channel 41 is used by the BSP 20 to not only inform the SAU 14 that forward link traffic channels 52 have been allocated to it, but also to inform the SAU 14 of allocated traffic channels 52 in the reverse link direction. Traffic channels 42-1 . . . 42-t on the forward link 40 are then used to carry payload data information from the BSP 20 to the SAUs 14. Additionally, maintenance channels 43 carry synchronization and power control information on the forward link 40 from the base station processor 20 to the SAUs 14. It should be understood that there are typically many more traffic channels 41 than paging channels 41 or maintenance channels 43.

In the preferred embodiment, the logical channels 41-43 and 51-53 are defined by assigning each channel a unique channelization code. The system 10 is therefore a so-called Code Division Multiple Access (CDMA) system in which multiple logical channels assigned to unique codes may use the same radio frequency (RF) channel. The logical or codes channels may also be further divided or assigned among multiple active SAUs 14. Additional information as to one possible way to implement the various channels 41, 42, 43, 51, 52, and 53 is provided in Patent Cooperation Treaty Application No. WO99/63682 entitled "Fast Acquisition Of Traffic Channels For A Highly Variable Data Rate," assigned to Tantivy Communications, Inc., and published on Dec. 9, 1999.

Figure 2:
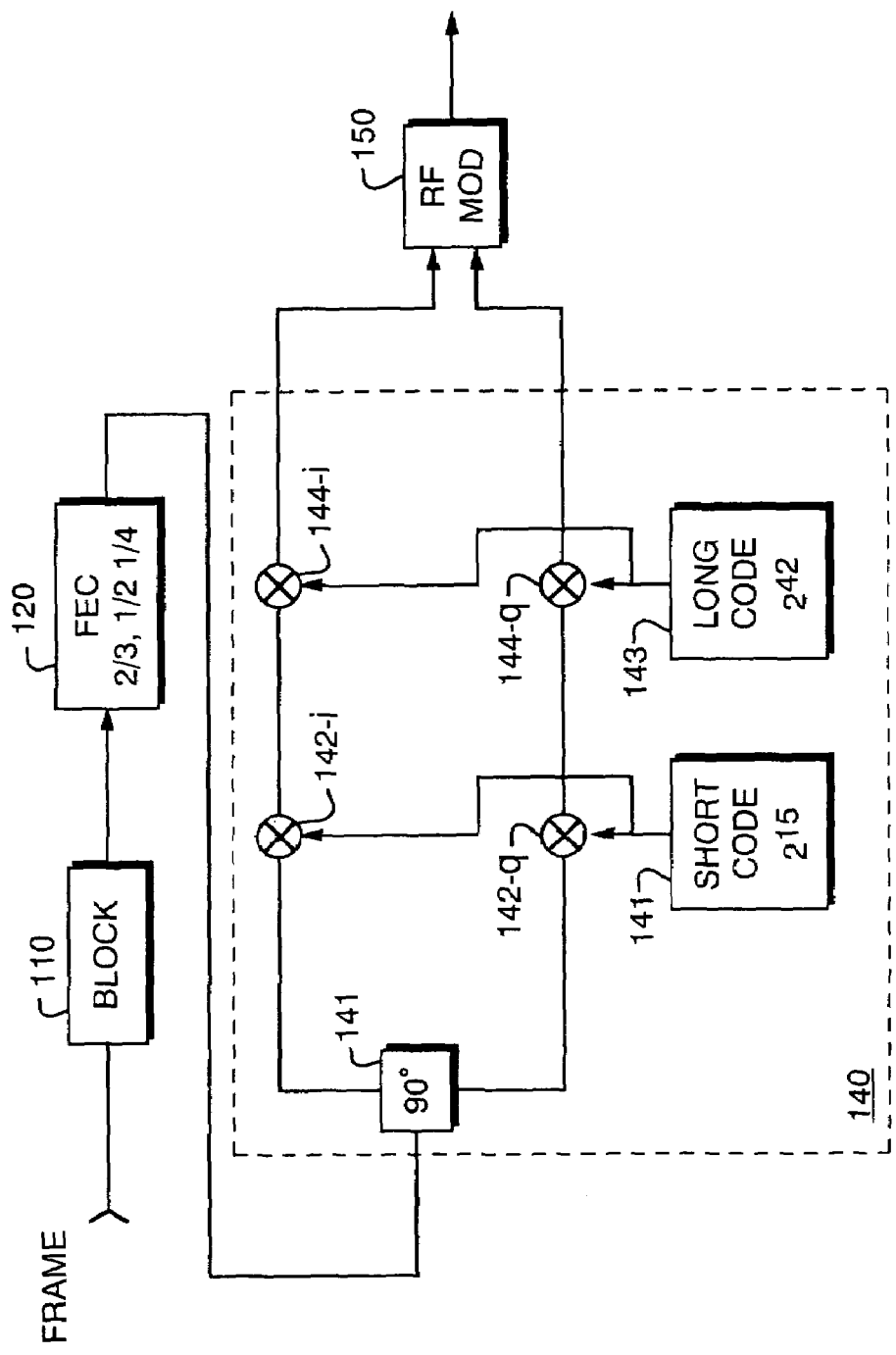
FIG. 2 is a more detailed view of a signal encoder used in the system.

Turning attention to FIG. 2 there is shown a generalized block diagram of a transmit signal encoding process used by the channel signal processor 100. The illustrated sequence of signal processing operations is performed to format, encode, and modulate at least the respective forward link 40 logical channels within the Base Station Processor (BSP) 20. Although the invention is described herein as being applied to the forward link 40, it should be understood that in other implementations it is possible for the invention to be applied on the reverse link 50, in which case the receiver is implemented in the BSP 20 and the transmitters are the SAUs 14.

In any event, a channel signal processor 100 includes a block formatter 110, Forward Error Correction (FEC) or block coder 120, channel coder 140 and radio frequency (RF) modulator 150. It should be understood that a corresponding receiver (not shown) performs the inverse functions of the corresponding portions of the transmitter signal processor 100. In such an instance, an RF demodulator performs the inverse radio frequency to modulation process, a channel decoder decodes the channel codes reversing the operation of the channel coder 140, and a block decode process also undoes the block encoder 120 and block formatter 110.

Before discussing the details of the block formatter 110 in more detail, it is instructed to consider the operation of the block encoder 120 which formats input data bits according to an error coding process. In particular, consider an example situation in the use of a turbo product code which is to encode data at the rate of ¼. Because the code is a ¼ rate code, the matrix encoding space consists of a matrix which is four times the size of the input data matrix space. Thus, a group of 1024 input bits are encoded as 4096 output bits by the block encoder 120. Thus, in the case of a ¼ rate code, three times as many parity bits as data bits are calculated and created.

However, in the preferred embodiment, the system provides for selection of a different rate turbo product code depending upon channel conditions, demand for use and other factors. Thus, at any given time, the selected block encoder 120 may be encoding the input data at a ⅔ rate, a ½ rate, or a ¼ rate.

Now more particularly, an input data frame, which may for example, be a TCP/IP frame, is first fed to a block formatter 110. The block formatter 110 packages input payload data into conveniently sized groups referred to as blocks. The size of these pre-encoded frames will vary depending upon the particular forward error correction (FEC) coding scheme selected at any given time by the block encoder 120. What is important is that the combination of the block formatter 110 and block encoder 120 produce a fixed number of output FEC symbols in each given transmitted block.

Thus, when the ¼ rate is selected by the block encoder 120, a ¼ rate block format 110 function is selected which groups incoming bits into pre-encoded FEC groups of 1024 bits, producing the desired 4096 output symbols. Similarly, when the ½ rate block encoder 120 is enabled, the block formatter 110 group incoming bits into pre-encoded sets of 2048 bits. When the ⅔ rate block encoder 110 is enabled, the block formatter groups 2730 input bits together.

The block formatter 110 and block encoder 120, working together, therefore ensure that a fixed block size of 4096 bits is fed to the channel coder 140. This in turn becomes important, since it permits the output of the channel coder 140 to include a known number of transmitted symbols per code epoch length. Thus, a fixed number of FEC symbols is maintained per transmitted block, independent of the FEC coding rates and power levels. This allows a different FEC rate or even at different FEC code to be assigned to each user channel, depending upon channel conditions, without changing the effective transmitted power levels.

The channel coder 140 accepts the block encoded data as a digital input signal. In the illustrated preferred embodiment, the channel coder includes a quadrature phase shifter 141, a short code generator 141, a first pair of quadrature modulators 142-i and 142-q, a long code generator 143, and a second pair of quadrature modulators 144-i and 144-q.

The quadrature phase shifter 141 accepts the input digital data signal and provides in-phase (i) and quadrature (q) signal paths.

The short code generator 141 is a $2^{15}$ length repeating code generator. It may be any suitable channel spreading sequence such as a pseudonoise (PN) sequence. The short code is fed to both the in-phase 142-i and quadrature 142-q modulators to spectrum-spread the respective signal paths.

In the preferred embodiment, the resulting output coded signal rate is desired to be 1.2288 Mega samples per second (Msps), to be compatible with legacy digital CDMA cellular systems. With a fixed block size of 4096 input bits and a short code length of $2^{15}$, this means that the PN spreading code epoch, or its repeat interval, is therefore 26 milliseconds (ms). In a preferred embodiment, the channel codes are a type of augmented PN code sequence which repeats at a code length of exactly $2^{15}$. One such coding scheme is described in U.S. patent application Ser. No. 09/255,156, filed Feb. 23, 1999, entitled "Method and Apparatus for Creating Non-Interfering Signals Using Non-Orthogonal Techniques", assigned to Tantivy Communications, Inc.

The long code generator 143 is a $2^{42}$ length code generator. This code is used to uniquely identify the respective paging channel 41, traffic channel 42, or maintenance 43. The long code may be a pseudonoise (PN), Walsh or other code sufficient to produce the CDMA channel signals 41, 42, or 43. Typically, the same long code is used for each channel, but with a unique code phase offset being used by each such channel. As with the short code modulation process, the long code is fed to an in-phase modulator 144-$i$ and quadrature modulator 144-$q$.

In certain instances, the long code generator 143 may not be used or may be in a different position in the process. For example, where it is desired that a particular traffic channel 42 is to be shard among multiple SAUs 14 during a given epoch, the long code generator 143 typically would not be used. Alternatively, in such an instance, the long code generator 143 could be located before the FEC block coder 120.

The RF modulator 150 accepts the digitally encoded signals, converts them to digital signals, and up-converts their carrier frequency to a desired radio frequency carrier, as is well known in the art.

Figure 3:
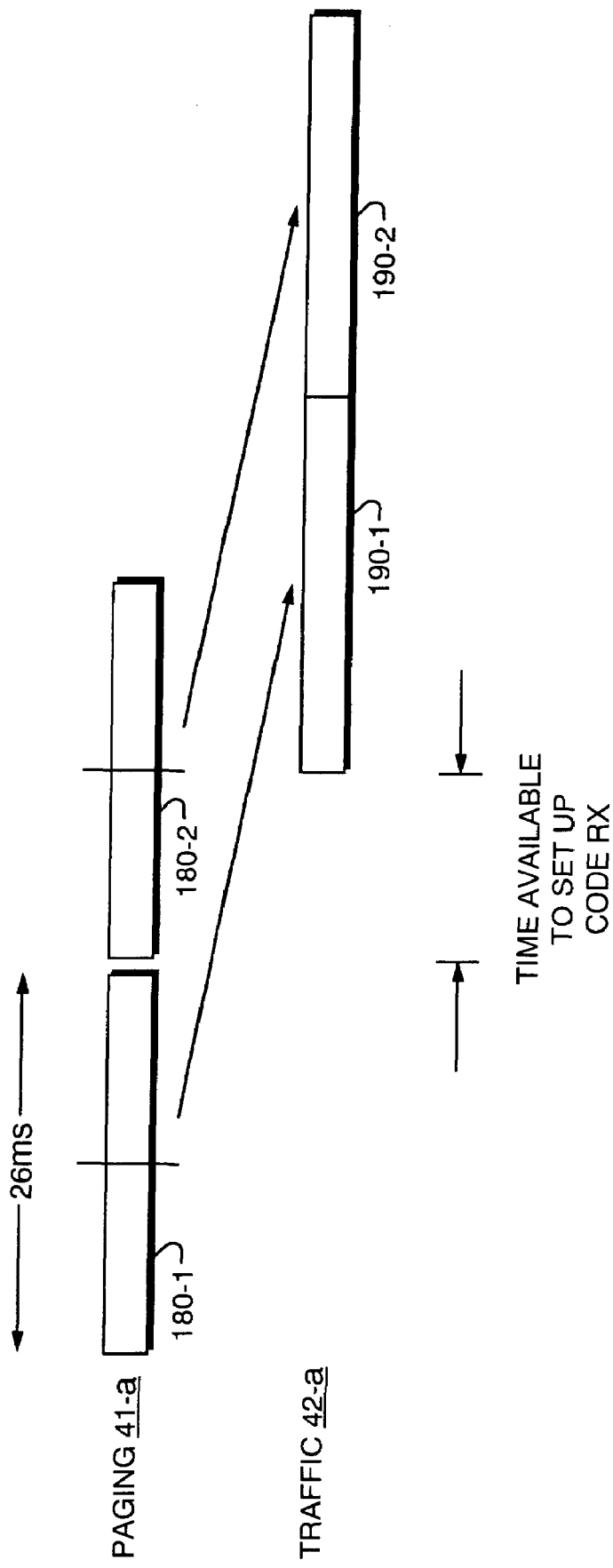
FIG. 3 illustrates the timing of paging channel epoch with respect to a corresponding traffic channel epoch.

Now turning attention to FIG. 3 the present invention can be understood more precisely. Illustrated there is an example of a series of successive epochs 180-1, 180-2, . . . that make up the paging channel 41. The idea with the present invention is to have the paging channel operate simultaneously with the traffic channel, so that channel assignment information can be continuously sent to the SAUs 14. The paging channel data is formatted into epochs 180-1, 180-2, . . . , as dictated by the channel coding in use. As explained above, for the desired 4096 block size, $2^{15}$ channel code length, and 1.2288 Msps output data rate, the epoch duration is 26 ms.

Each epoch in the paging channel is time slotted, such that a time slot is devoted to one of the active or standby SAUs being serviced by the BSP 20. The time slots carry enough information to permit each potential receiving SAU 14 to determine unique code assignments for respective epochs 190-1, 190-2, . . . of the traffic channels 42. The timing of the traffic channel epochs 190 is therefore delayed with respect to the associated paging channel epoch 180. Advancing the channel switching information relative to the delivery of the payload information in the traffic channel provides time for decoding and reconfiguration of the receiving SAUs 14. The amount of this time delay depends upon the amount of time needed to setup the code demodulators in the respective receiver. In a preferred embodiment, this time delay is equal to approximately one-half the epoch duration, or 13 ms.

It has been found to be advantageous to separate the broadcast of code channel information into the dedicated paging channel 41 rather than attempt to include it with the encoded traffic channel 42 payload data. This is because the traffic channels 42 are ideally power controlled such that the traffic channels 42$a$ associated with one of the SAUs 14$a$ may not necessarily be transmitted at the same power level as the traffic channels 42$b$ assigned to another one of the SAUs 14$b$. For example, a signal transmission intended for an SAU 14$a$ which is located closer to the BSP 20, typically does not need to use as much signal power as a transmission intended for an SAU 14$b$ which is located farther away from the BSP 20. However, the power level of the channel that carries the channel switching information should be sufficiently high at all times so that all active and standby SAUs 14 (e.g., all of those which are not in an idle or off mode) can reliably obtain their channel assignment information.

Figure 4:
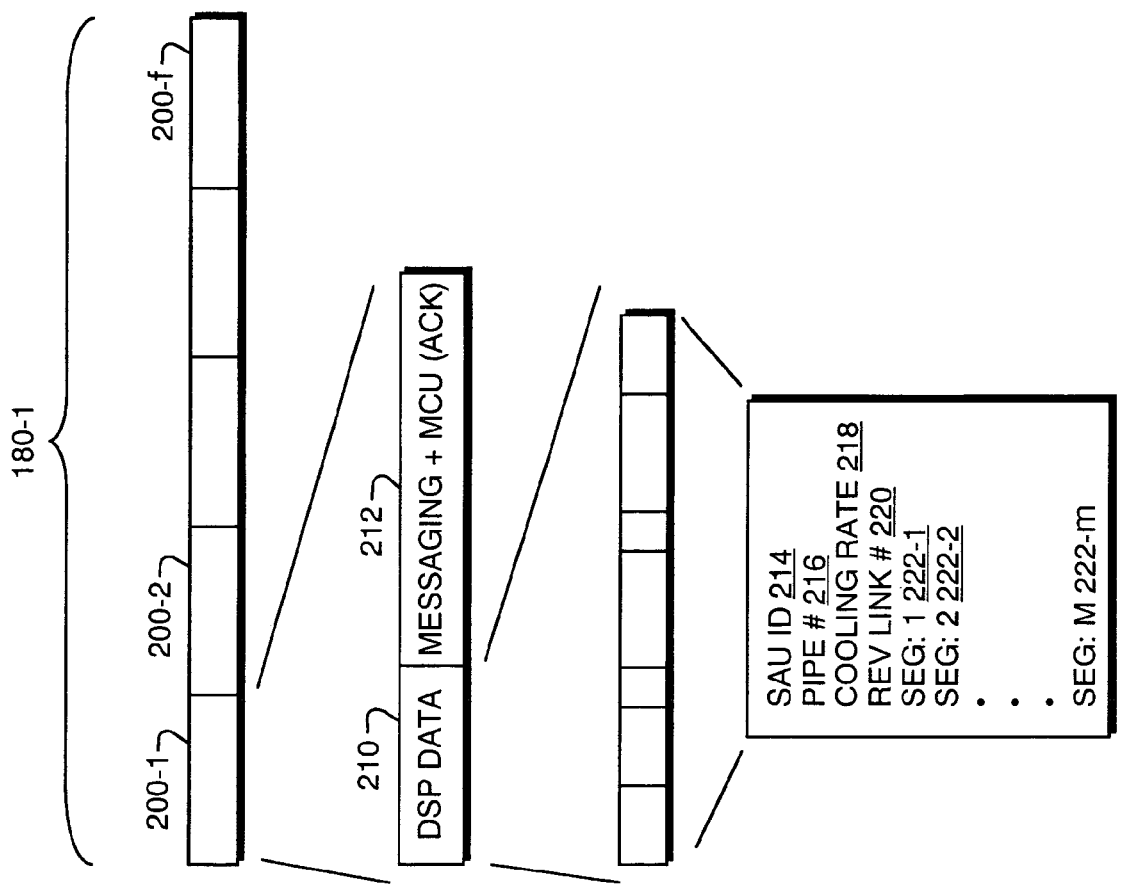
FIG. 4 illustrates the format of a portion of paging channel message.

Turning attention to FIG. 4, the format of the paging channel and the channel setup information contained therein will now be described in greater detail. An epoch 180-1 of the paging channel is devoted to a broadcasting in a format that contains a series of time slots 200-1, 200-2, . . . , 200-$f$. The number, f, of time slots 200 depends upon the maximum number of SAUs 14 that are expected to be in an active mode (e.g., presently in the process of receiving data) or an idle mode (e.g., having active higher layer connections or sessions but not presently receiving data).

Each time slot 200 contains a Digital Signal Processor (DSP) data field 210 and an MCU messaging field 212.

The DSP data field 210 includes in turn, an active SAU identifier (SAU ID) 214, a pipe number 216, a coding rate 218, a reverse link number 220, and one or more additional message segments 222-1, 222-2, . . . , 222-$m$.

For each traffic channel epoch 190 duration, a central controller such as located at the BSP 20, determines a schedule of assignment of traffic channels 42 to active and standby SAUs 14 terminals for that epoch. For each SAU 14 designated as active during the epoch, an active SAU ID is assigned. The active SAU ID 214 can be as short as possible to allow the time slots 200 in the paging channel to be as short as possible. Thus, the active SAU ID 214 does not have to be a serial number that is sufficiently long to uniquely identify the specific SAU 14 among all possible devices in the system 10. It only needs to uniquely identify the SAU 14 among other active or standby SAUs 14 being serviced by the particular BSP 20 at a given time.

The SAU ID 214 can be assigned to the SAU 14 during an initial authentication process. However, if the epoch 26 duration and number of time slots 200 permits, this SAU ID can be more in the nature of a device serial number.

Also during an authentication procedure, or at some other time prior to expected reception of the paging channel messages, each SAU 14 may be given certain information such as pipe configurations, which will be explained in further detail below.

In any event, for each SAU 14 designated as active or standby during each epoch 26, the BSP 20 assigns a list of active channels for such terminal unit. Then, prior to the start of each epoch, information in the form of a pipe identifier 216 is sent in the associated time slots 200 in paging channel. The pipe identifier indicates a group of code channels for which the specific SAU 14 is to receive traffic channel data in the next following traffic channel epoch 190.

The BSP 20 may therefore maintain a couple of tables such as are shown in FIGS. 5 and 6. FIG. 5 illustrates a pipe configuration table 250. The notion of a "pipe" herein is the assignment of one or more code channels together in a group. Thus, for example, pipe 1 is a shorthand notation referring to code channels 1 and 2; pipe 2 is a notation indicating code channels 1, 2, 3, and 4; and so on.

A pipe schedule 252 is also maintained in the BSP 20, such as is shown in FIG. 6. The pipe schedule 252 is a master plan for how the available pipes are to be assigned to specific active or standby SAUs 14 for each epoch 190. The exact manner of deciding which channels and how many channels to assign to specific SAUs is not the concern of the present invention. It suffices here to say that this depends upon how many SAUs are active, how much data has been queued for transmission to a specific SAU 14, how far away each SAU 14 is from the BSP 20 and hence how much of a drain is it on the available power link budget, whether the system 10 supports any notion of tiered service, where certain users have priority over other users, and other considerations.

The pipe notation permits the channel setup information in each time slot 200 to be as concise as possible, while allowing rapid allocation and deallocation of multiple code channels for each epoch as needed.

At the SAU 14, upon receiving the paging channel message, the active SAU ID 214 is read for each time slot. The SAU ID is then compared to any previously assigned to that particular SAU 14. If the SAU ID is recognized as one of its own, the SAU 14 will then continue to process the remainder of the information in the time slot 200, to determine the pipe identifier 216, code rate 218, reverse link 220 and control message information 22 that pertains to its next traffic channel epoch 190.

On a predetermined subsequent epoch 190 of the traffic channel, the SAU 14 may then be set up to receive its assigned channels, as indicated from the pipe identifier. Have already received the pipe configuration information during authentication, each SAU 14 can then determine a list of channels to which it should be listening during the next traffic channel epoch.

As explained above, the information in the paging channel time slots 200 should be sent at a time advanced sufficiently to permit setup of the required number of code channel receivers in each SAU 14.

The paging channel set up message may also include other information, such as to indicate a coding rate 218 for the associated traffic channels. This permits implementation of the variable rate FEC codes as mentioned above in connection with FIG. 2.

Also, additional information such as a reverse link channel identifier 220 can be included in the paging channel slots 200. This can indicate a channel number for the SAU 14 to use for reverse link transmissions back to the Base Station Processor 20, such as to carry physical layer reply messages associated with the same epoch. Such messages may include, for example, physical layer acknowledgment (ACK) messages and the like.

The MCU messaging field 212 can be used to carry messages from the BSP 20 to the MCUs 101. This can further expedite the transmission of short messages on the forward link that are sent frequently. For example, the MCU messaging field 212 may be used to carry link layer acknowledgement messages.

Other information can be carried in control segment portions 222 associated with each paging channel slot 200, if needed. The control segment portions 22 can be used to support the shared of a single traffic channel 42 among multiple SAUs 14. For example, the segment 222 information can specify how the data carried in the epoch 190 associated with the paging channel slot 200 is to be shared among the multiple SAUs14. A first control segment (seg1) may indicate a starting bit position for a first SAU sharing the associated traffic channel 42, (seg2) to indicate a starting bit position for a second SAU 14 sharing the traffic channel 42, and so on.

What is claimed is:

1. In a demand access system configured for communication among a group of terminals, a method comprising the steps of:
   determining a schedule of assignment of traffic channels to active terminals for a sequence of predetermined time periods;
   for each terminal designated as active during such time periods, assigning a terminal unit identifier;
   for each terminal designated as active during each time period, assigning an identifier of a list of active channels for such terminal unit; and
   prior to the start of each time period, sending messages on a paging channel, the messages indicating terminal unit identifiers and the identifier of the list of active channels for such time period, wherein the predetermined time period being a code epoch repeat duration associated with codes to encode the transmissions of the traffic channels.

2. A method as in claim 1 additionally comprising the step of:
   for at least one selected terminal unit, receiving the paging channel messages, and detecting a paging channel message intended for itself by comparing a received terminal identifier from the paging channel message to a previously assigned terminal identifier.

3. A method as in claim 2 additionally comprising the step of:
   at the selected terminal unit, on a predetermined subsequent epoch, processing the active traffic channels as indicated from the list of active traffic channels indicated by a received paging channel message.

4. A method as in claim 1 wherein the paging channel messages are time slotted.

5. A method as in claim 1 wherein the paging channel forms a portion of a forward link communication channel.

6. A method as in claim 5 wherein the steps of assigning a terminal unit identifier and a list of active channels are performed at a central base station location.

7. A method as in claim 1 wherein the paging channel messages are sent at least one-half epoch duration prior to the epoch contained associated active traffic channel data.

8. A method as claim 1 wherein the paging channel messages are sent at a time advanced sufficiently to permit code setup in a receiver prior to the epoch containing the associated traffic channel data.

9. A method as in claim 1 wherein the paging channel messages also indicate a coding rate for the associated traffic channels.

10. A method as in claim 1 wherein the paging channel message also indicates a reverse link channel identifier for the terminal to use during the associated epoch.

11. A method as in claim 1 wherein the paging channel message also includes a controller message field for carrying a message to a control processor located in the terminal.

12. A method as in claim 1 wherein the paging channel contains a specification for which portions of the payload are intended for particular terminals.

13. A method as in claim 1 wherein the terminals share access to a predetermined number of coded traffic channels.

14. In a demand access system configured for communication among a group of terminals, a method comprising the steps of:
   determining a schedule of assignment of traffic channels to active terminals for a sequence of predetermined time periods;
   for each terminal designated as active during such time periods, assigning a terminal unit identifier;
   for each terminal designated as active during each time period, assigning an identifier of a list of active channels for such terminal unit; and
   prior to the start of each time period, sending messages on a paging channel, the messages indicating terminal unit identifiers and the identifier of the list of active channels for such time period, the list of active channels being indicated by a pipe group identifier, each pipe group identifier indicating a list of active channels that are assigned in groups.

15. A method as in claim 14 wherein the terminals are remote located wireless subscriber access units.

16. In a demand access system configured for communication among a group of terminals, a method comprising the steps of:

determining a schedule of assignment of traffic channels to active terminals for a sequence of predetermined time periods;

for each terminal designated as active during such time periods, assigning a terminal unit identifier, for each terminal designated as active during each time period, assigning an identifier of a list of active channels for such terminal unit;

prior to the start of each time period, sending messages on a paging channel, the messages indicating terminal unit identifiers and the identifier of the list of active channels for such time period, the terminals sharing access to a predetermined number of coded traffic channels; and further comprising a coded traffic channel being shared among multiple terminal units, and the paging channel message specifying how the traffic channel data in the associated epoch is to be allocated among the terminal units.

17. A demand access system configured for communication among a group of terminals, the system comprising:

a controller that contains a traffic channel assignment scheduler that determines a schedule of assignment of traffic channels to active terminals for predetermined time periods; and a transmitter, for rip or to the start of each predetermined time period, sending a message on a paging channel that indicates active terminals and active channels for such time period, a traffic channel pipe configurer, that determines a list of active channels for the predetermined time period, and assigns a pipe identifier to the list; and the paging channel message transmitter message indicating active channels by sending the pipe identifier.

18. A system as in claim 17 additionally comprising:

a receiver, located at one of the terminal units, for receiving the paging channel messages, and detecting a paging channel message intended for itself by comparing a received terminal identifier from the paging channel message to a previously assigned terminal identifier.

19. A system as in claim 18 additionally comprising:

at the receiver in the terminal unit, on a predetermined subsequent time period, processing active traffic channels as indicated from the list of active traffic channels indicated by the pipe identifier in a received paging channel message.

20. A system as in claim 17 wherein the paging channel messages are time slotted.

21. A system as in claim 17 wherein the paging channel forms a portion of a forward link communication channel.

22. A system as in claim 17 wherein the terminals are remote located wireless subscriber access units.

* * * * *

UNITED STATES PATENT AND TRADEMARK OFFICE
CERTIFICATE OF CORRECTION

| | |
|---|---|
| PATENT NO. | : 7,289,469 B2 |
| APPLICATION NO. | : 11/053092 |
| DATED | : October 30, 2007 |
| INVENTOR(S) | : Alapuranen et al. |

It is certified that error appears in the above-identified patent and that said Letters Patent is hereby corrected as shown below:

ON THE FACE PAGE

Title Page at Item (56), U.S. PATENT DOCUMENTS, page 2, left column, line 17, delete line beginning with "5,657,358" and insert therefor --5,657,358 A 8/1997 Paneth et al.--.

IN THE DRAWINGS

FIG. 4, line 3 inside lowest box, delete "COOLING RATE 218" and insert therefor --CODING RATE 218--.

IN THE SPECIFICATION

At column 1, line 18, after the word "unprecedented", delete "rates" and insert therefor --rate--.

At column 1, line 40, after the word "systems", delete "provide" and insert therefor --provides--.

At column 1, line 62, before the word "most", delete "the".

At column 1, line 63, after the words "equipment are", delete "perform" and insert therefor --performing--.

At column 2, line 12, after the word "these", delete "architecture" and insert therefor --architectures--.

At column 2, line 18, before "wireless", delete "idea" and insert therefor --ideal--.

At column 2, line 37, after the word "error", delete "cording" and insert therefor --coding--.

At column 2, line 66, after the words "can be", delete "services" and insert therefor --serviced--.

At column 4, line 6, before the word "from", delete "an" and insert therefor --and--.

At column 6, line 31, before the word "incoming", delete "group" and insert therefor --groups--.

UNITED STATES PATENT AND TRADEMARK OFFICE
CERTIFICATE OF CORRECTION

PATENT NO. : 7,289,469 B2
APPLICATION NO. : 11/053092
DATED : October 30, 2007
INVENTOR(S) : Alapuranen et al.

It is certified that error appears in the above-identified patent and that said Letters Patent is hereby corrected as shown below:

At column 6, line 42, after the word "even", delete "at" and insert therefor --a--.

At column 7, line 18, after the words "to be", delete "shard" and insert therefor --shared--.

At column 9, line 14, after the word "information", delete "22" and insert therefor --222--.

At column 9, line 48, after word "portions", delete "22" and insert therefor --222--.

At column 9, line 49, before the words "of a", delete "shared" and insert therefor --sharing--.

IN THE CLAIMS

At claim 7, column 10, line 34, before the word "associated", delete "contained" and insert therefor --containing--.

Signed and Sealed this

Twentieth Day of May, 2008

JON W. DUDAS
*Director of the United States Patent and Trademark Office*